No. 853,200. PATENTED MAY 7, 1907.
F. ELLICOTT.
METHOD OF AND MEANS FOR GOVERNING PRIME MOTORS.
APPLICATION FILED AUG. 22, 1906.
8 SHEETS—SHEET 1.
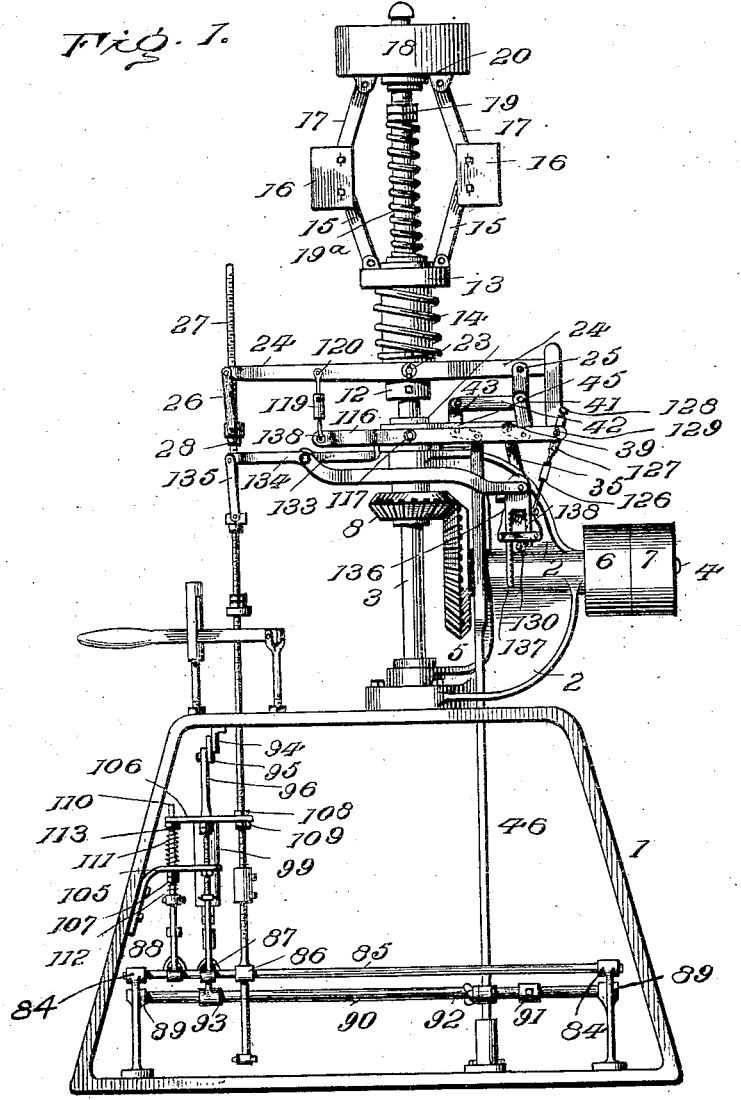
Witnesses
W. A. Williams
Inventor
Francis Ellicott
By Stewart & Stewart
Attorneys No. 853,200. PATENTED MAY 7, 1907.
F. ELLICOTT.
METHOD OF AND MEANS FOR GOVERNING PRIME MOTORS.
APPLICATION FILED AUG. 22, 1906.
8 SHEETS—SHEET 2.
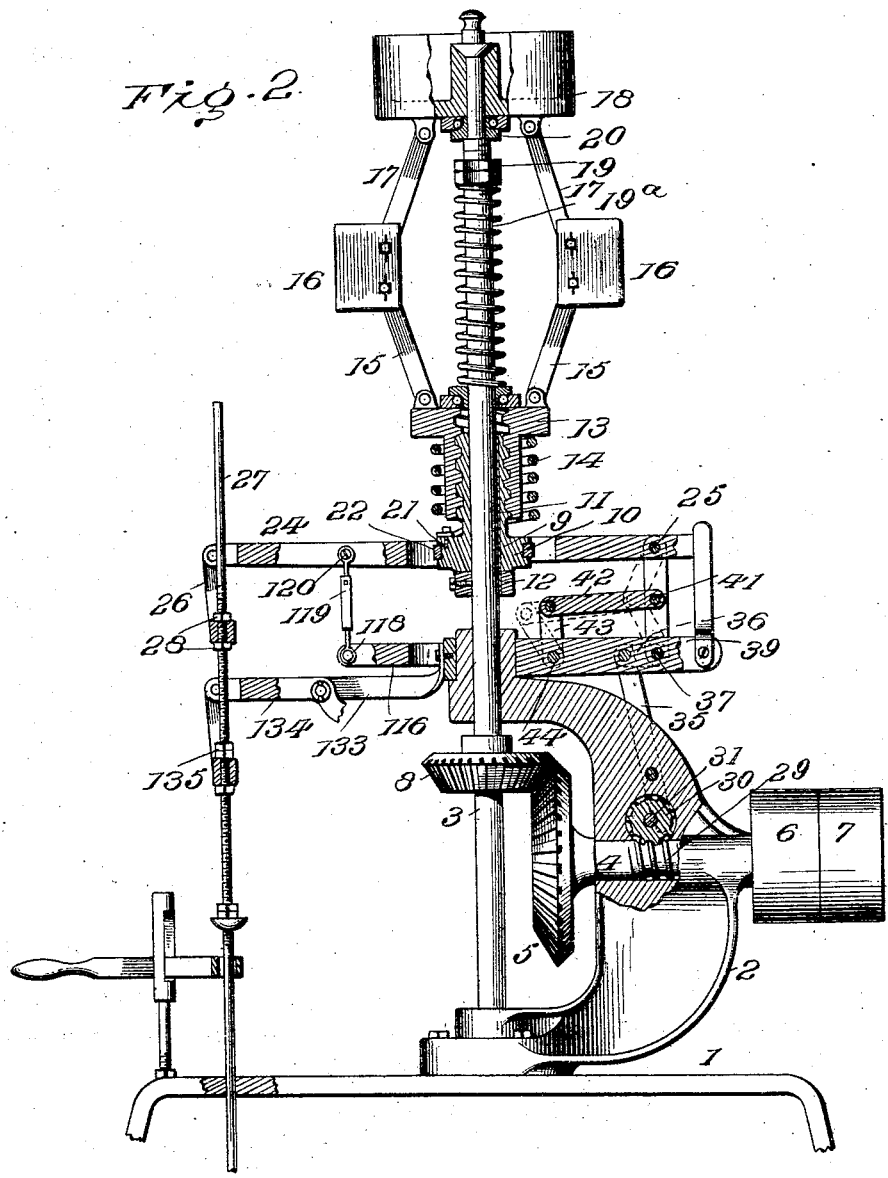

No. 853,200. PATENTED MAY 7, 1907.
F. ELLICOTT.
METHOD OF AND MEANS FOR GOVERNING PRIME MOTORS.
APPLICATION FILED AUG. 22, 1906.
8 SHEETS—SHEET 3.
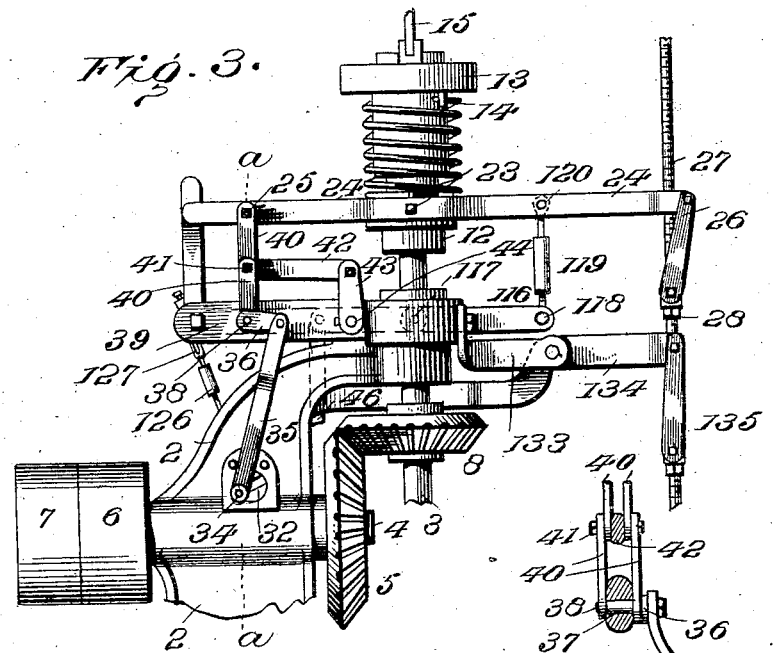
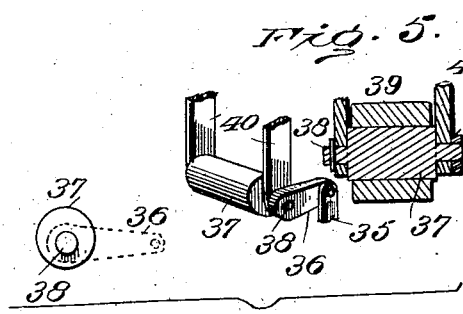
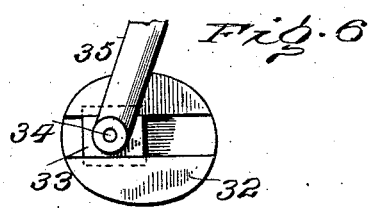
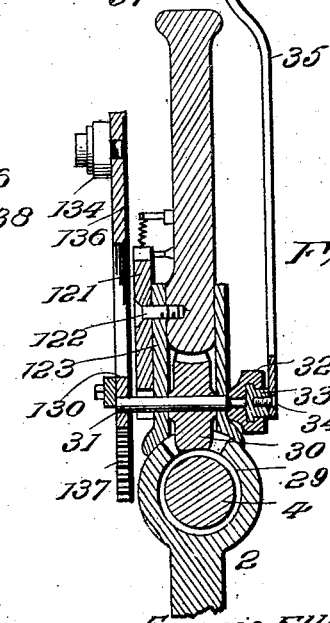
Inventor
Francis Ellicott
By Stewart & Stewart
Attorneys
Witnesses
W. A. Williams

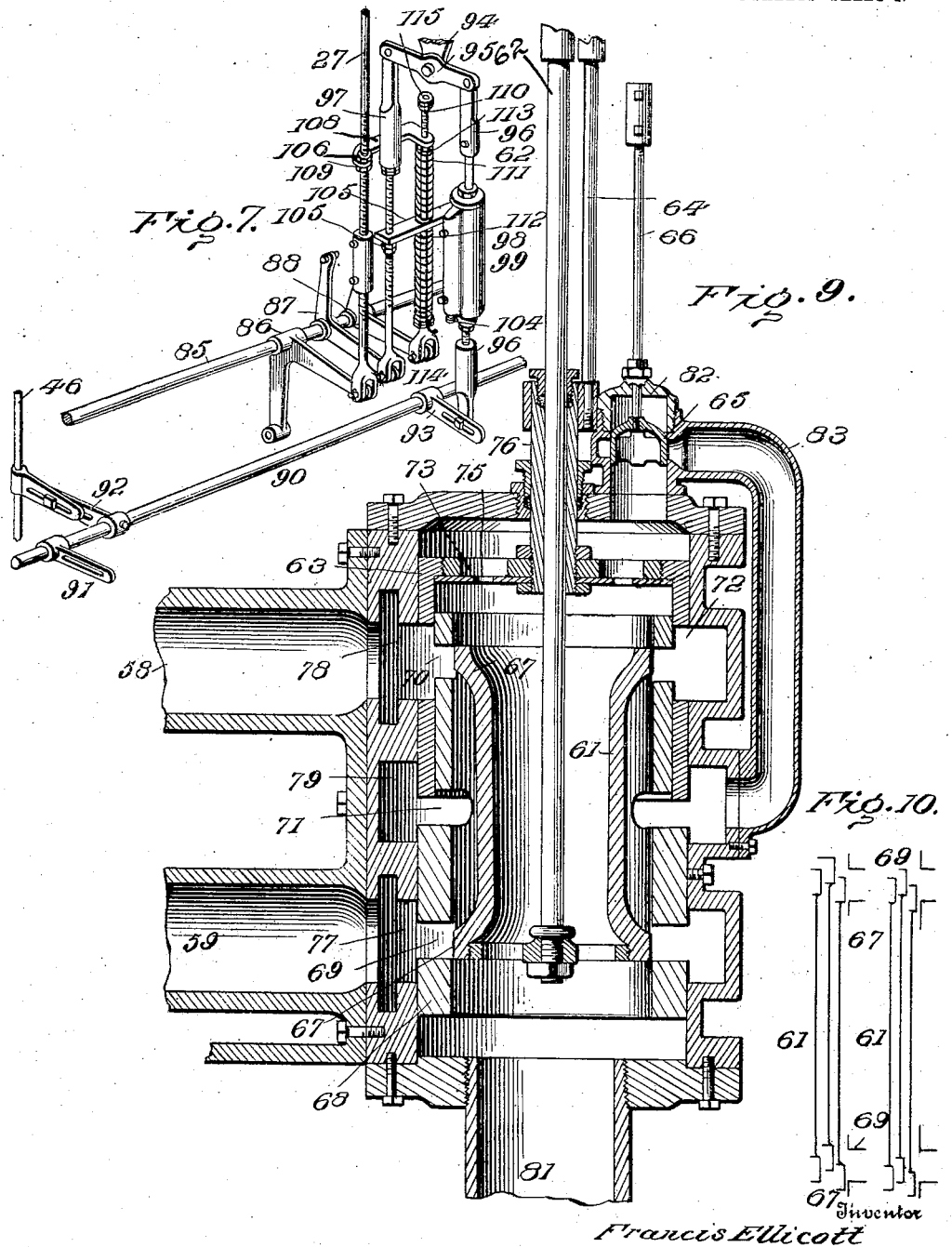

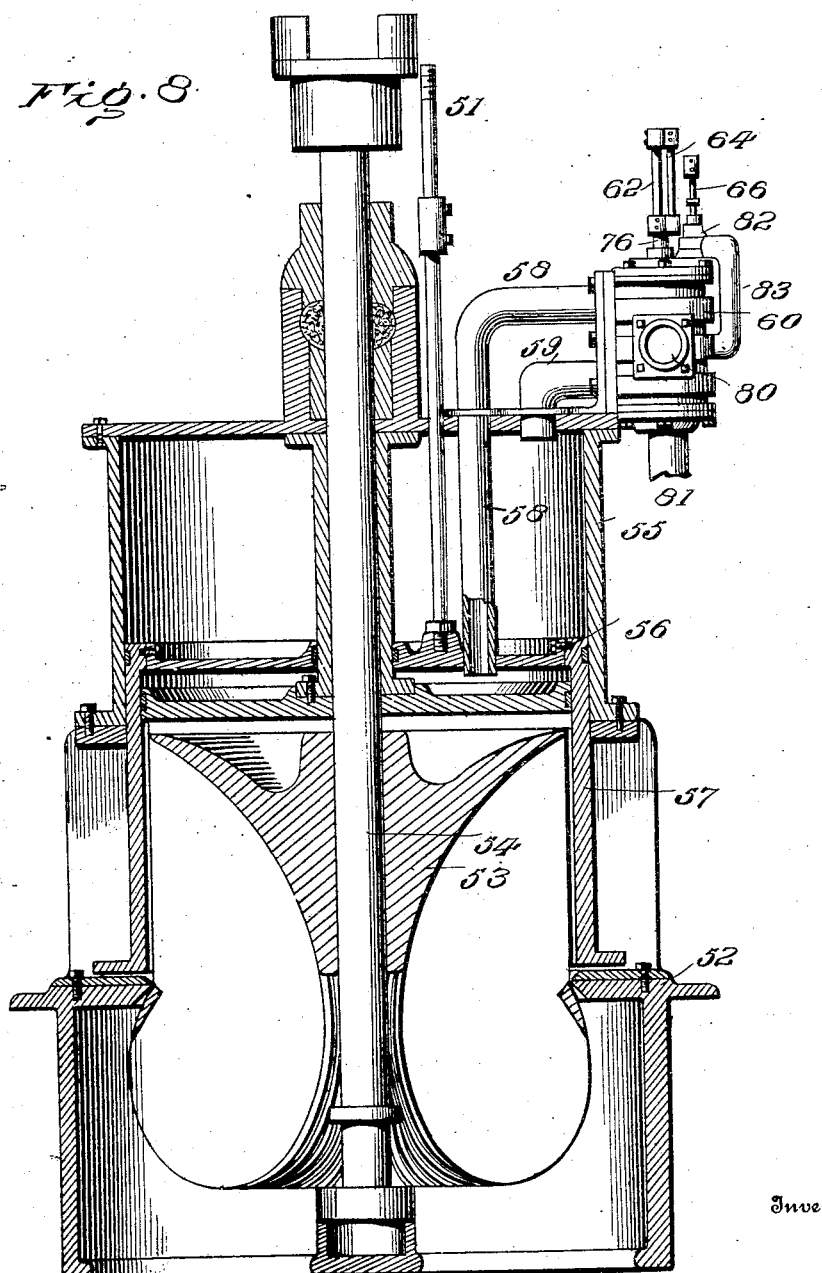

No. 853,200. PATENTED MAY 7, 1907.
F. ELLICOTT.
METHOD OF AND MEANS FOR GOVERNING PRIME MOTORS.
APPLICATION FILED AUG. 22, 1906.
8 SHEETS—SHEET 6.
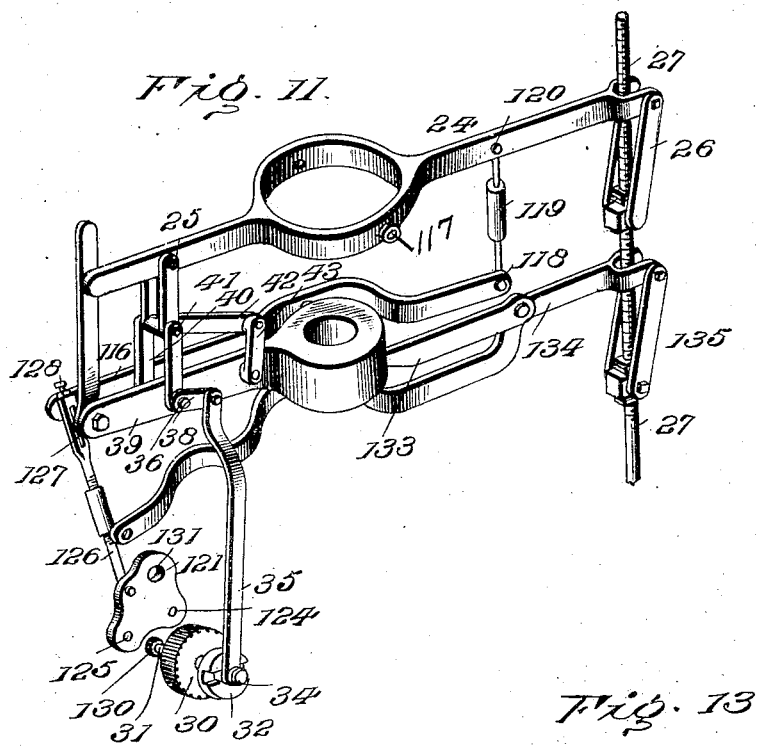
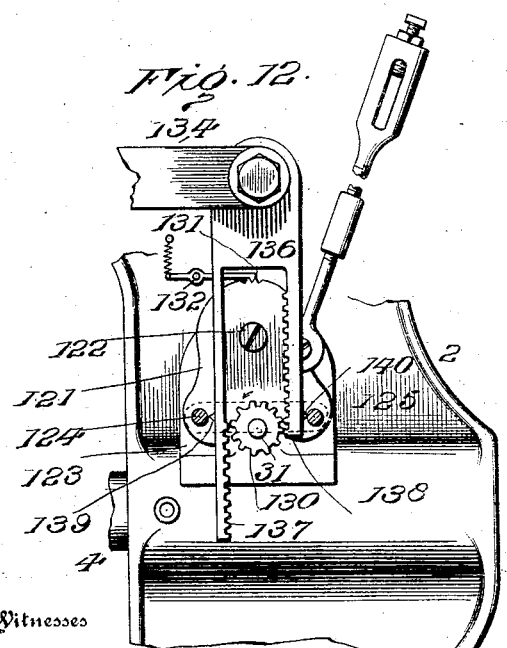
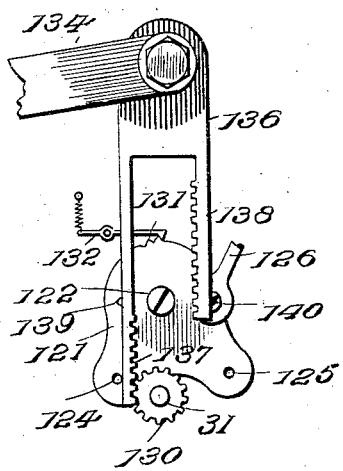
Inventor
Francis Ellicott
By Stewart & Stewart
Attorneys
Witnesses
W. A. Williams No. 853,200. PATENTED MAY 7, 1907.
F. ELLICOTT.
METHOD OF AND MEANS FOR GOVERNING PRIME MOTORS.
APPLICATION FILED AUG. 22, 1906.
8 SHEETS—SHEET 7.
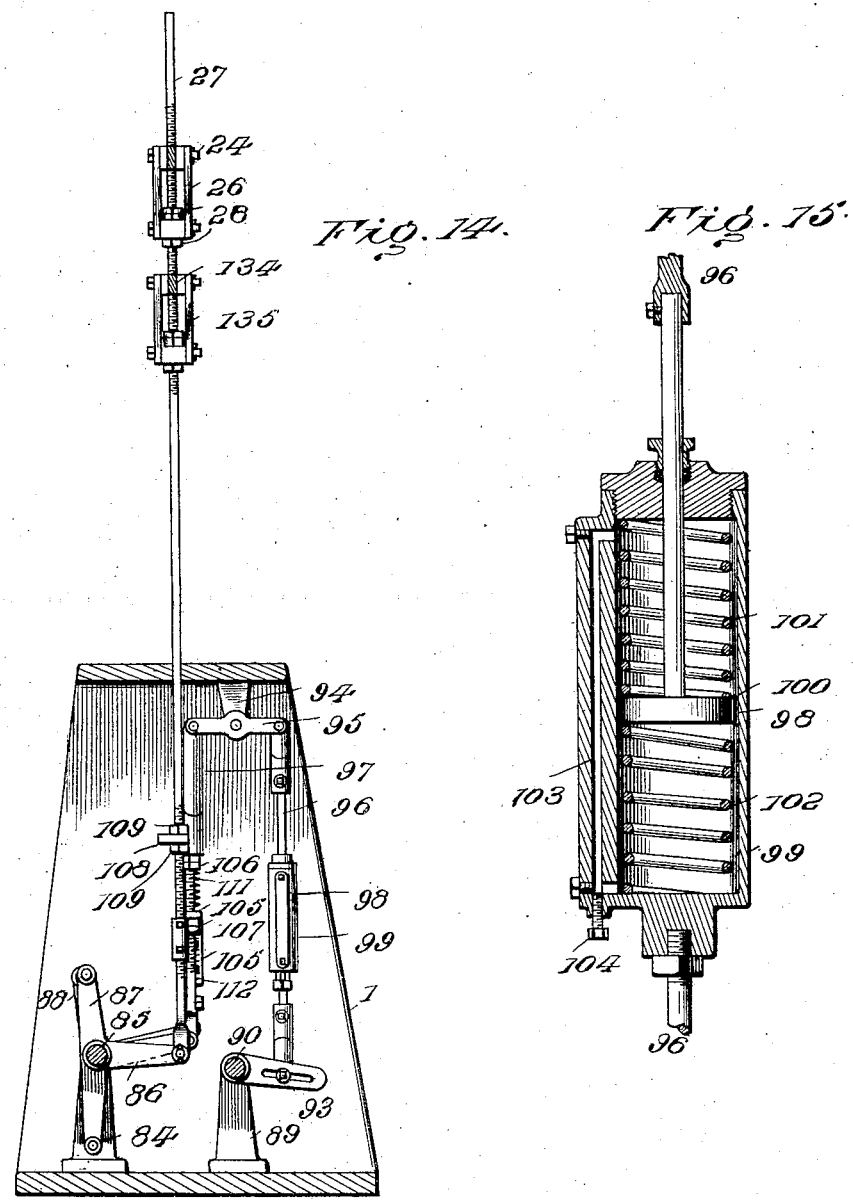
Inventor
Francis Ellicott
Witnesses
By Steuart & Steuart
Attorneys

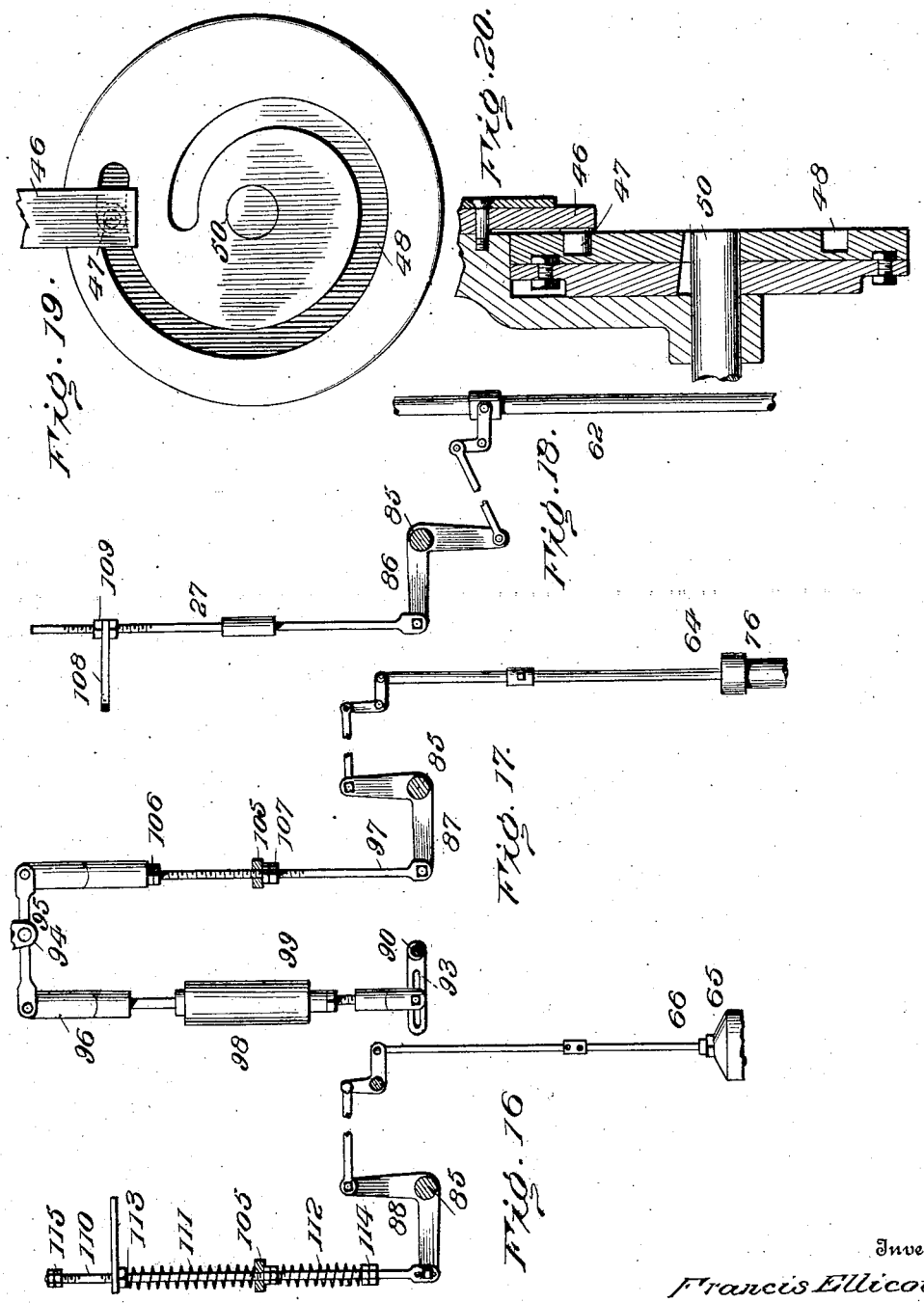

UNITED STATES PATENT OFFICE.

FRANCIS ELLICOTT, OF BALTIMORE COUNTY, MARYLAND.

METHOD OF AND MEANS FOR GOVERNING PRIME MOTORS.

No. 853,200.          Specification of Letters Patent.          Patented May 7, 1907.

Continuation of application filed November 19, 1902, Serial No. 132,024. Divided and this application filed August 22, 1906.
Serial No. 331,670.

*To all whom it may concern:*

Be it known that I, FRANCIS ELLICOTT, a citizen of the United States of America, and a resident of Baltimore county and State of Maryland, have invented certain new and useful Improvements in Method of and Means for Governing Prime Motors, of which the following is a specification.

My invention relates to a method of and means for governing a prime motor, and is particularly applicable to the government of a turbine water wheel.

The principles involved in the apparatus thus employed might be used for the government of any other kind of prime motor, such, for instance, as a steam engine or an electric motor, but the apparatus which I will describe in this case is a governor of a turbine water wheel in which the centrifugal governor is employed to actuate the motor controller. The motor controller consists of a device for moving the gate by which water is admitted so as to develop the necessary power. The admission of pressure to the gate moving mechanism is accomplished through a combination of valves. The weight, inertia, and immobility of water makes it difficult to use it, and an apparatus operated in it with as much speed as is desirable for the close government of a motor.

There are several problems which present themselves in the construction of a governor for a turbine water wheel, which are due to the peculiar nature of the fluid element employed. It has heretofore been found difficult to bring a turbine water wheel to exact speed, and then with a very slight change of speed begin to govern quickly enough. It has also been found difficult to regulate the speed of government to correspond with the amount of the fluctuation of the speed at any particular moment.

In the operation of government, the ideal performance consists in a motion of the gate, either opening or closing, to a point which will bring the wheel under existing conditions of load exactly to speed. A fluctuation of the load always takes place prior to the motion of the gate and before the conditions affecting the runner can be altered. When the gate is opened or closed, the existing inertia or momentum of the moving parts cannot be overcome in an instant and a certain interval of time will always exist during which an increased quantity of water must build up the speed of the wheel to equal the load, or a decreased supply of water will permit the load to drag down the speed until reduced to the normal. Usually, therefore, it has been necessary in an attempt at government to provide an apparatus which would over-govern, that is to say, when a load was thrown onto a wheel to open the gate wider than would be necessary to equalize the added load, in order to accelerate the building up of the speed, and then to gradually close the gate when the speed has been built up so as to bring the speed back to normal, and in the reverse, when the load has been taken off of the wheel, to close down the gate to a point below that necessary to equalize the existing load, allow the load quickly to draw down the speed of the wheel and then open the gate again to bring the speed back to normal. This operation of government, while usually necessary, involves an oscillation of the governor weights between extremes, which requires a considerable interval of time to bring the governor to a state of rest and the wheel to exact speed. In some cases this oscillation is undesirable.

To overcome these difficulties, I have discovered a method of government, which requires for its practical employment a mechanical construction, but the method might be put into practice by the use of many different forms of mechanical construction, and some of its advantages might be utilized by operating the mechanism by hand.

The invention consists of a method and means for imparting to the motor controller, or the motor, or governor, or the stream of fluid actuating the motor, a constant, auxiliary, vibration or pulsation, whereby the motor and governor are maintained in a constant state of limited motion, in which condition they will respond promptly to a desired change of speed.

Most governors, operating as they may upon the speed controlling mechanism of a motor, employ centrifugal force in some revolving parts for the purpose of regulating the speed. The mechanisms are adjusted in such a way that at any given speed the parts which are designed to be influenced by centrifugal force will travel away from the center, and will keep a position which will be the result of the centrifugal force developed by the speed of rotation multiplied by the weight of the parts, and resisted by so much resistance as it may be desired to apply in connection with the motor controlling mechanism. This resistance is generally applied in the form of springs, and the weights of moving parts; for any given speed, therefore, the moving parts which are influenced by the centrifugal force have a certain path of motion which is the resultant of the forces acting upon them, and that path of motion is a constant path so long as the speed continues to be the same. The momentum created by the motion of the parts which move, the inertia resulting from the stationary position of the parts which do not move, or if they move in one path but not in another, the inertia due to their want of motion in any but one single path, and the friction of the parts, will combine to produce a certain element of resistance to a change of position.

If we assume the path of the parts which are moving under the influence of centrifugal force as a neutral line, then the elements mentioned will resist any tendencies of those parts to move out of that neutral line, whether under the influence of an acceleration of speed or of a reduction of speed; therefore it is that in all forms of centrifugal governors heretofore made which are known to me a certain change of speed, even as high as a half of one per cent or more, may take place either in acceleration or retardation before the governor will respond; and then when it does respond, due to a considerable change of speed, it may move farther than is actually necessary to accomplish the result desired, and an oscillation of the governor take place, which will extend considerably the time within which the governor is able to bring the motor to speed.

Now my invention, as already stated, consists in a method and means for imposing upon the governor an auxiliary vibration by which the elements of momentum, inertia, and friction which co-operate to resist a change of position in a centrifugal governor are eliminated, and the apparatus is left free of these retarding influences to act in response to the slightest increase or decrease in speed.

I overcome mechanically the influences which operate to retard the prompt action of the governor, and thereby give to the governor its ideal activity and bring it to a state in which a change of motion under a sudden change of speed is but slightly resisted.

My method also has the effect of taking up any lost motion which might exist in the connections of the governor, the motor controller and the motor, and causes the motor to respond with the utmost promptitude to the influence of the governor. Then, too, in the case of a hydraulic governor, such as is herein described, the parts are maintained in a state of constant activity.

The governing apparatus which was described in patents granted to me on the 25th of December, 1900, No. 664,392 and 664,394, consisted, essentially, of a piston balanced between active opposing pressures and moving in the direction of least resistance, by reducing the pressure on the side toward which it is desired the piston shall move, the gate being directly connected to the piston. This apparatus is sensitive and effective to accomplish the government of a turbine water wheel, but I increase its sensitiveness and increase its activity by throwing upon the motor controller an auxiliary vibration through a limited path. The amplitude of that auxiliary vibration at the instant which it is desired to change the position of the motor controller is increased so as to cause the motor controller to move in the direction desired, at the same time continuing the vibration through the same amplitude, but in a different position. The valve mechanism by which the pressure is varied on each side of the controller piston is also reciprocated or vibrated past its ports, reducing and admitting pressure first to one side and then to the other side of the controlling piston, maintaining these pressures opposed to one another and balanced during the normal vibration, but over-balanced at the instant of an abnormal movement; the effect of the vibration being, in most cases, to cause the valve to be opened and closed alternately so as to impart to the piston controlling the gate successive impulses of acceleration and retardation, while maintaining an interval between the impulses during which the operating pressure may become effective upon the runner of the wheel to build up its speed or the reverse if it is decreasing during the operation of government.

The successive impulses imparted to the motor controller accomplished by means of the vibrations are in themselves an independent mode of action, which might be accomplished by other means. In another application, Serial Number 331,669, which I have filed concurrently with this one I have described an independent mechanism by which these successive impulses may be imparted to the controller; the action is the same, however, although the mechanism may be different. The invention consists in a method and means for vibrating and retarding the controller and holding it at a minimum velocity for a period of time long enough to permit the motive power to become effective upon the motor, or the load to pull down the speed and then accelerating and retarding the controller again and so on until exact speed is reached.

Another mode of operation which constitutes a mechanical process which I have found effective, and which may be carried into operation by various forms of mechanism, one of which is described in this case, consists in the peculiar motion given to the gate. I so adjust the valves by which the gate is controlled that a period of time will be occupied in changing the gate from one position to another for various changes of load depending upon the position of gate, slowly for low gate, fast for high gate, the changes of gate being made for the purpose of holding the speed as nearly uniform as possible. The gate is first moved slowly for slight changes of speed, and rapidly for great changes of speed, then slowly again as speed is approached.

It will be understood that the momentum of a plant running from a motor may be spoken of generally as the "flywheel-effect." The larger the plant being operated, the greater the momentum of the parts, and the relation between the momentum and the first load will vary with the gate, that is to say, a small load and low gate the momentum of the moving parts of the mechanism will bear a high proportion to the load being carried; when the load is larger, however, and the gate nearly wide open the proportion between the load and the momentum of the moving parts is quite different. This flywheel-effect will maintain the speed of the motor under slight changes of load for a period of time proportionate to the relation between the momentum of the plant and the change of load; also that the flywheel-effect will maintain the speed for a long period of time when the motor is running at low gate and for a short period of time when it is running at a high gate. For this reason it is necessary in governing a wheel at high gate to govern it quickly, that is to say, at high gate to move the gate at high velocity, and in both cases, whether governing at high gate or low gate, it is desirable that the speed of the gate should correspond to the variation of the position of the gate from the position in which it is desired it shall stand; that is to say, in moving the gate from any particular position in which it may be, to the position in which it is desired it shall stand, it is desirable that it shall move as fast as may be necessary until the greater part of its path of motion has been covered, and that it shall then move slowly up to the position it is desired it shall occupy. To accomplish these various results, the operation consists in moving the gate slowly at first, increasing the speed to a maximum proportionate to the amount of change of gate required, and then reducing the speed again gradually until the gate comes to a position at which it is desired it shall stop. This function is result of the mechanism which is described, but it is also a mode of operation which is quite independent of the particular mechanism described, and it might be accomplished by various forms of mechanism, or even by hand.

The momentum varies with the size of the plant. The speed with which the water enters the wheel varies with the head. In some installations the load fluctuates but little, in others the load fluctuates greatly. Hence in the construction of a water wheel governor it is necessary that all of the possible conditions for all kinds of installations and all conditions of the head should be provided for, and that the governor should be capable of an adjustment so as to control the gate in the most advantageous manner under all the possible conditions under which a wheel may be placed. The scope of the apparatus must be as wide as the possible variations of conditions under which a wheel may be called upon to operate. There are some conditions when the gate is to be thrown much further open than would be necessary for the change of load and then returned to a proper position, or it may have to be returned again below the proper position and in some cases caused to vibrate backward and forward across the line representing its proper position to meet the required conditions of government, or it may be that the gate should be moved from any given position to an exact position which will produce normal speed for any particular change of load. Or it may be better to step the gate up to normal speed line, always causing it to move in one direction.

My governor is capable of adjustment so as to meet all these varying conditions in whatever form they may appear so as to produce under any condition of load, head or plant, the most perfect regulation and constant speed.

In the statement of invention and the claims of this case I have used the words "constant auxiliary vibration." By these words I intend to be understood as meaning that a continual vibration is imposed upon the motor controller which is independent of and in addition to the normal vibration which exists in the structure due to normal causes and that this vibration, which is of predetermined extent and interval, is imposed upon the structure by any means, and is in addition to and auxiliary of the normal motion of the controller. And I believe I am the first person who has ever discovered the possibility of the use of such a vibration and who has used it to increase the sensitiveness of a motor controller and augment its efficiency. I have also said that the vibration is imposed upon the "motor controller" and by this term I desire to be understood as meaning all that train of mechanisms which controls the speed as well as the power of the motor. The constant auxiliary vibration may be produced in many ways,—by the pulsation of the stream flowing to the motor, by the vibration of the gate, or its actuating means, or the valves controlling this actuating means, or as shown in this case by imposing upon the centrifugal device and the valve of the controller simultaneously the auxiliary vibration. The vibration is communicated through the entire train of mechanisms and, in fact, pulsates the stream flowing to the motor.

I will now describe an apparatus which I have found effective to carry the methods which are above set forth into operation;

Figure 1 is a vertical elevation of my governor, showing its connections with the motor controller. Fig. 2 is a vertical elevation, partly in vertical section, of the governor device and part of the connecting means employed in my governor. Fig. 3 is a vertical elevation of a detached part of my governor showing the device for vibrating the governor head. Fig. 4 is a vertical section through the line a—a of Fig. 3. Fig. 5 shows three detached views, one in vertical section, of the device for vibrating the governor head. Fig. 6 is a detached detail of a part of the device for vibrating the governor head. Fig. 7 is a perspective view of the rods and levers by which my governor is connected to the motor controller. Fig. 8 is a vertical section of the turbine water wheel and the motor controller; the valve mechanism being in full elevation. Fig. 9 is a vertical section of the valve mechanism operating my motor controller. Fig. 10 is a diagram showing the various positions occupied by the main valve. Fig. 11 is a detached perspective view of the rods and levers by which the vibrating motion, the parallel motion, and the relay motion are obtained. Fig. 12 is a side elevation showing the relay mechanism in one position. Fig. 13 shows the relay mechanism in the opposite position. Fig. 14 is a vertical elevation, partly in section, of the rods and levers shown in Fig. 7, by which the valves are connected together and operated. Fig. 15 is a vertical section of the cushion dash pot by which the motion of the exhaust valve is controlled. Figs. 16, 17 and 18 are detached diagrams showing the relation of the various levers and rods by which the relief, exhaust, and main valves are operated. Fig. 19 is a face view of the eccentric by which the motion of the gate is communicated to the mechanism for effecting the parallelism of the gates. Fig. 20 is a section taken at right angles to Fig. 19.

Referring to Fig. 1, 1 is a stand mounted upon any suitable part of the machine; 2 is a bracket mounted on the top of the stand; 3 is a vertical shaft mounted in suitable bearings in two arms of the bracket 2; 4 is a counter shaft journaled in the body of the bracket 2 at right angles to the shaft 3; 5 is a beveled gear fast on the end of the counter shaft 4; 6 and 7 are fast and loose pulleys on the countershaft 4; 8 is a beveled gear on the shaft 3 meshing with the gear 5.

Referring to Fig. 2, 9 is a feather on the shaft 3 above the bracket 2; 10 is a screw also on the shaft 3, and having a longitudinal way, 11, cut in it in which stands the feather 9, and through which the power of the shaft 3 is communicated to the screw 10; 12 is a collar fast on the shaft 3, supporting the screw 10 and the parts with which it is connected above when they are at rest; 13 is a nut threaded on to the screw 10; 14 is a coil spring, one end of which is secured to the screw 10, and the other end of which is secured to the nut 13, this coil spring constituting the only driving connection between the nut and the screw. The power of the shaft 3, which is communicated to the screw 10 by means of the feather 9, is transmitted to the nut 13 and its connected parts by means of this coil spring only. To the upper end of the nut 13 is connected a pair of links 15—15, to the upper end of which are secured the weights 16—16, to these weights are also secured the links 17—17, which at their upper ends are secured to the flywheel 18, mounted upon the top of the shaft 3; 19 is a pair of set-nuts on the shaft 3; between the nut 13 and the set-nuts 19 is a spring 19ª, which surrounds the shaft 3; and above these set-nuts is the stationary part of the bearing 20, upon which the flywheel 18 rests and turns; on the lower end of the screw 10 is a hub in which there is circular groove 21, and in the groove a ring 22, to the sides of which is pivoted, by means of trunnions 23, a lever 24, which has a circular aperture in its center which surrounds the ring 22, and through which the trunnions pass; the lever 24 is pivoted at one end at the point 25, and at the other end is connected by means of the links 26 to the main valve rod 27; the links 26 are connected to the main valve rod by means of set nuts 28, so as to adjust connection between the rod 27 and the lever 24; on the counter shaft 4 is cut a worm 29 with which meshes a worm wheel 30 mounted upon a pin 31 journaled in the bracket 2; this construction is best shown in the sectional view Fig. 4. The pin 31 protrudes through the bracket 2, and on its front end is mounted a crank pin plate 32, shown in Fig. 6; the crank pin plate is provided with a longitudinal slot across its center and in the slot is mounted an adjustable crank pin block 33 into which is secured the crank pin 34; to the crank pin is connected a connecting rod 35. The crank pin block 33 may be adjusted at varying distances from the center of the crank pin plate so as to give any desired throw to the crank pin; at its upper end the connecting rod 35 is connected to an arm 36 fast on an eccentric pin 37. The eccentric pin is shown in Fig. 5. It consists of a central portion and two end portions of smaller diameters than the central portion, the end portions being located eccentrically of the central portion. The center portion is marked 37, and the end portions are marked 38—38.

Referring to Fig. 3, 39 is an arm projecting from a boss secured upon the upper end of the bracket 2; in a hole in this boss is journaled the portion 37 of the eccentric pin, the two eccentric ends 38, 38 projecting on each side beyond the arm 39; upon the eccentric ends 38—38 of the eccentric pin are loosely fitted the links 40—40, and on one of the eccentric ends 38 of the pin is fastened the arm 36; the links 40—40 (which are secured together) at their upper ends are secured to and form a pivot for the lever 24, the pivot having been previously numbered 25. It will be seen that as the counter shaft 29 runs constantly the crank pin plate 32 will constantly revolve and give to the communicating rod 35 a constant vertical motion. This will move the arm 36 and the pin 37 and cause the eccentric portions 38 of the pin 37 to described an arc around the axis of the pin 37 as a center, and by so doing give to the links 40—40 and the point 25 a vertical vibrating motion. This vibration will be imparted to the lever 24 and all of the other parts of the governor head, and to the main valve and also through the motion of the valve to the piston, so that all of the parts will be maintained in a constant state of activity.

The links 40—40 are four in number, the two lower links are journaled upon the eccentric pins 38—38, and the two upper links are journaled to the lever 24, and the links are pivotally connected together at the center by a pin 41. To the pin 41 is connected a link 42; to the opposite end of this link 42 is connected an arm 43 which is fast upon a pin 44 journaled in the arm 39. On the opposite side of the arm 39 the pin 44 projects, and upon its end is secured the arm 45, to the free end of which is fastened a rod 46 which passes through and is guided in the bracket 1, and at the lower end is provided with a cam roller 47, which stands in the cam groove 48 of the face cam 49. The rod 46 is formed in two section connected by levers 91 and 92 on the shaft 90 (see Fig. 7), which afford means for adjusting the throw of the upper portion thereof, which pivotally engages the end of the lever 45. The lower portion pivoted to the arm 91 carries the roller 47. The cam 49 is mounted upon a shaft 50, by which it is turned. The shaft 50 is connected by means of a rack and pinion or other mechanism not shown, and which it is thought unnecessary to show, with the rod 51 shown in Fig. 8, by which the motion of the gate is positively communicated to the cam 49, and, through the chain of levers described, to the links 40—40, bending those links as the gate opens, and straightening them again as it closes. The angle of the links 40—40 will therefore always occupy a fixed relation to the position of the gate.

Referring now to Fig. 8, 52 is the wheel casing in which is mounted the turbine water wheel runner 53 on the shaft 54; on the top of the casing 52 is mounted a cylinder 55, in which reciprocates a piston 56. The piston 56 surrounds the shaft 54 more or less loosely, and fits into the cylinder 55 more or less loosely. To the piston 56 is secured a cylindrical gate which regulates the supply of water to the wheel. 58 is a port admitting pressure to the cylinder 55 below the piston 56, and for this purpose it passes through an aperture in the piston. 59 is a port admitting and exhausting pressure to the upper end of the cylinder 55. The cylinder 55 is open to penstock pressure both through the ports 58 and 59, and also through apertures and joints which are made loose so as to permit leakage. 60 is a valve chest mounted on the top of the cylinder 55, and in which are arranged three valves shown in Fig. 9. The main valve 61, to which is connected a main valve stem 62, an exhaust valve 63, to which is connected an exhaust valve stem 64, and a relief valve 65, to which is connected a valve stem 66; the main valve 61 is cylindrical in form, hollow in the center, and of smaller diameter at its middle portion than at its ends, having two cylindrical ports covering surfaces one at each end, which are marked 67—67; these port covering surfaces are narrower than the ports, the distance between the outside edges of the port covering surfaces is the same as the distance between the outside of the ports; but the distance between the inside edges of the covering surfaces is greater than the distance between the inner edges of the ports; this produces a lead to exhaust. The valve is suspended from the lower end of its valve stem 62. It reciprocates upon the interior of the cylindrical casing 68, which is provided with three sets of ports: port 69, by which pressure is admitted to exhaust from the upper end of the cylinder 55, port 70, by which pressure is admitted to exhaust from the lower end of the cylinder 55, and a central exhaust port 71, connected to exhaust. The upper portion of the cylindrical casing 68, above the exhaust port 71, is of smaller diameter on its interior than the lower portion, and surrounding this smaller portion of the cylindrical casing is a cup-shaped cylindrical exhaust valve 63, which is provided with a series of ports 72, all on the same horizontal plane, which register with the ports 70 in the upper end of the cylindrical casing 68, but are of greater width than the ports 70, so that no matter what the position of the exhaust valve may be, the ports 70 will always remain open. The lower end of the exhaust valve 63 has a bearing upon the shoulder formed by the difference in thickness of the two parts of the cylindrical casing 68; and its reciprocation to and away from that shoulder closes or opens the exhaust. The exhaust valve is also provided with apertures 73 in its upper surface, which are covered on the interior of the valve with a leather disk 74. The leather disk is also provided with smaller apertures 75 registering with the apertures 73. 76 is a sleeve which passes through a bushing in the top of the valve chest, and is secured to the exhaust valve 63 at its inner end. Through the center of the bushing passes the main valve stem 62, and to the side of the cylinder 76 is secured an exhaust valve stem 64. The interior of the valve chest 60 is provided with three cored channels 77, 78, and 79, which are circular, and surround the entire interior surface of the valve chest. To the channel 77 is connected a port pipe 59, to the channel 78 is connected a port pipe 58, and to the central channel 79 is connected an exhaust 80. 81 is a pressure inlet by which water is admitted to the valve chest. On the top of the valve chest 60 is mounted an auxiliary valve chest 82, in which reciprocates the relief valve 65. From the side of the valve chest 82 an exhaust port 83 passes around the outside of the main valve chest and connects with the exhaust channel 79. The valve 65 when in one position covers the exhaust port 83; when it is either higher or lower than that position, the exhaust port 83 is uncovered. Under normal conditions the exhaust valve 63 is balanced by uniform pressure on both sides of its head, the pressure entering the inlet at 81, passing through apertures 75 in the leather diaphragm 74, and balancing the pressures upon the two sides of the head of the valve. When the relief valve 65 is moved off of its port, either up or down, the pressure above the exhaust valve is instantly relieved, and the greater pressure below will force the exhaust valve upward into the top of the valve chest, and open the exhaust as wide as the motion of the relief valve permits. By this device it is possible at any desired instant to increase speed with which the gate may be opened or closed, and the extent and duration of that accelerated speed may be regulated by the operation of the relief valve. The main valve is loosely fitted into the cylindrical casing 68, and its two heads stand normally over the ports 69 and 70. The heads are of less width than these ports, and inasmuch as the valve is normally maintained over the ports or slightly beyond the ports in one direction or the other, the position of the piston, due to the pressures on the two sides of the piston, and the consequent position of the gate may be maintained or regulated at will. The three valves by which the device is operated are connected to the various parts of the governor heads by a system of levers and rods, which are shown in Figs. 3, 7, 11, 14, 16, 17 and 18.

In Figs. 11 and 14 the levers and rods are shown assembled, in Figs. 16, 17 and 18 they are shown detached, so as to make the connection plainer.

Referring to Figs. 11 and 14, 84—84 are a pair of brackets standing upon the base of the bracket 1, and in which is mounted a rod 85. On this rod are journaled a series of bell crank levers 86, 87, and 88. On the same bracket 1 are another pair of brackets 89—89, in which is journaled a rock shaft 90, mounted parallel to the rod 85. Upon the rock shaft 90 are secured three arms 91, 92, and 93. Suspended from the under side of the top of the bracket 1 is a bracket 94 on the end of which is journaled a lever 95. To one end of the lever is secured the rod 96, and to the other end a rod 97. The rod 96 has as an integral part of it a cushion dash pot 98 shown in Fig. 15 in vertical section. It consists of a cylinder 99 in which reciprocates a piston 100; the upper portion of the rod 96 is connected to the piston 100 and the lower portion of said rod to cylinder 99, and above the piston is a spring 101, and below the piston a spring 102. Connecting with the two extreme ends of the cylinder 99 is a by-pass port 103, and in that port is a valve 104 by which the aperture of the by-pass may be controlled. The cylinder 99 is filled with oil, and the by-pass will permit the oil to flow from one end of the cylinder to the other at a regulated speed. When a thrust is given to either end of the rod 96, the piston will be moved in the cylinder either up or down compressing one or the other of the springs, and forcing the oil from one end to the other end of the cylinder. As soon as the pressure is relieved, however, the springs will reassert themselves, and tend to balance one another and bring the piston to the center of the cylinder: when doing so, they will force the oil back to the end from which it came, and the whole structure will re-establish itself in a normal position. The lower end of the rod 96 is connected to the lever arm 93 fast on the rock shaft 90. The arm 91 is also fast on the rock shaft 90 and is connected by means of cam 48 and rod 46 with the rod 51, which is secured to the piston 56. The motion of the gate is thus communicated to the rock shaft 90, and it corresponds to that motion. The rod 97 connected to the opposite end of the lever 95 is connected at its lower end to the horizontal arm of the bell crank 87. 105 is a bracket secured to the side of the bracket 1, and projecting horizontally; it is provided with two holes through one of which passes the rod 97. The rod 97 is threaded at its middle portion, on which are located two pairs of set-nuts 106 and 107. These nuts are adapted to be set at any desired position, and to limit the motion of the rod 97 by contact with the bracket 105. The vertical arm of the bell crank 87 is connected by means of a horizontal rod to the vertical arm of a bell crank, to the horizontal arm of which is pivoted the exhaust valve stem 64 as shown in Fig. 17.

As has previously been stated, the rock shaft 90 is also provided with an arm 91 shown in Fig. 7, which is connected directly with the gate. It will therefore be seen that the exhaust valve, through the medium of the connections just described, will have a motion corresponding to that of the gate. By the setting of the set-nuts 106 and 107 the exhaust valve may be permitted to open to any desired extent, or close to any desired extent. It may be prevented from closing entirely; that is, it may also be prevented from opening wide; that is, it may be given any desired throw.

The action of the exhaust valve previously described under the influence of the relief valve 65,—that is to say, its opening when the relief valve is open,—could not occur unless there were some elastic element in the train of connections between the gate and the exhaust valve. This elastic element consists in the cushion dash pot 98, operating as described to permit the independent opening of the exhaust valve when desired, and closing it again under the influence of the springs in the dash pot as soon as the equilibrium of the pressures on the two sides of the exhaust valve is re-established. The main valve rod 27 is connected to the horizontal arm of the bell crank 86, and upon this rod is mounted an arm 108 held in place by set-nuts 109, by which it may be given any desired location on the rod.

Referring to Fig. 18, it will be seen that the main valve rod 27 is connected by means of various rods and levers including the bell crank 86 to the vertical arm of which is pivoted a rod which is substantially horizontal and which is pivotally connected at its other end to the vertical arm of a bell crank, to the horizontal arm of which is pivoted a block engaging the main valve stem 62, so that all the motions of the governor head are communicated through the rod 27 to the rod 62. The bell crank 88 has a vertical and a horizontal arm. To the horizontal arm is secured a rod 110, which reciprocates vertically through the aperture in the bracket 105. Surrounding the rod 110 are two springs 111 and 112, one above and one below the bracket 105. 113 is a nut on the rod 110, and adapted to press upon and compress the spring 111 when the rod 110 is forced downward. 114 are a pair of set-nuts upon the rod 110 against which the spring 112 presses at its lower end, and by which the spring may be compressed against the bracket 105 when the rod is drawn up. 115 are a pair of set-nuts located upon the upper end of the rod 110 to determine the point at which the arm 108 may operate the rod. The rod 110 passes through an aperture in the free end of the arm 108 which is secured to the rod 27, and the nuts 113 and 115 are engaged by the arm 108 as it rises or falls beyond a certain amplitude of motion, and by them the rod is drawn up and forced downward, as the case may be. The vertical arm of the bell crank 88 is connected to the relief valve 65, by means of a horizontal rod pivotally attached to its vertical arm and pivotally connected at its opposite extremity to the vertical arm of a bell crank to the horizontal arm of which is pivotally attached the valve stem 66 so that every motion of the rod 110 produced by the contact of the arm 108 with the nuts 113 and 115 will be communicated to the relief valve, and raised or lowered at any correspondence with the motion of the main valve rod. The object of this construction will be apparent. When the wheel is running at low gate, and the exhaust valve is consequently nearly closed, it will be understood that the gate can only be opened so fast as the exhaust aperture of the exhaust valve will permit the escape of fluid from the governing cylinder. This aperture may be so small as to compel the motion of the gate to be too slow to catch up with the added load, and the result might be that the load would be too heavy for the acceleration of the wheel, and the wheel might be brought to a standstill. It is necessary, therefore, that with an added load the exhaust should be opened wide enough to permit a quick opening of the gate to correspond with the load added. This is accomplished by the mechanism shown. The drop of the main valve rod 27 due to the drop of speed on the line, produced by an added load, will bring the arm 108 in contact with the nut 113, raise the relief valve, exhaust the pressure from the upper side of the exhaust valve, and permit the exhaust valve to be constantly thrown open an amount dependent upon the setting of the nuts 106 and 107, which limit the motion of the exhaust valve by the bracket 105. This action, as before described, will cause a compression of one of the springs in the dash pot before the gate can move. The free exhaust of one of the cylinders will permit a quick motion of the piston toward the exhaust and a consequent opening of the gate.

*Relay device.*—I have shown in this case what I call a "relay device." It is a device by means of which the gate having once been started to open or close, is checked in its motion after it has moved a short distance, and the change of fluid admitted to the wheel is permitted to become fully effective upon the runner to raise or lower the speed before the gate is given another impulse, when if the speed has not reached a desired point by the first motion of the gate, another impulse is given to the gate, and so on step by step until the speed is returned to normal. The mechanism by which this action is accomplished is shown in Figs. 11, 12, and 13. Some parts are also shown in Fig. 1.

116 is a lever pivoted on the side of the upper end of the bracket 2 at 117, and at one of its ends, marked 118, connected by an adjustable link 119 with the lever 24 at the point marked 120. It will be observed that every motion of the lever 24 will be communicated to the lever 116 and will cause the free end of that lever to move up and down.

121, Figs. 12 and 13, is a plate pivoted upon the stud 122 secured in the bracket 123, which is a part of the bracket 2. The plate 121 is shown in detached view in Fig. 11. It is provided upon its two lower corners with pins 124 and 125. To one side of the triangular plate 121 is connected an arm or link 126 which is provided with means for extending it so as to give it any desired length. The end of the link 126 is provided with a slot 127 parallel to its axis, and in the end of the link is a set screw 128 which is capable of adjustment and setting so as to regulate the length of the slot 127. In the end of the lever 116 there is a pin 129 which passes into the slot 127 and controls the plate 121 by its bearing upon the end of the slot in the link 126. It will be seen that when the lever 24 moves up and down by the action of the governor head the pin 129 will also move up and down in an opposite direction, by the lever 116. So long as the pin 129 is not in contact with either end of the slot 127 the motion of the lever 24 will not affect the link 126, but as soon as the depression or rise of the lever 24 is sufficient to cause the pin 129 to come into contact with one end of the slot 127, the link 126 will be turned, the plate 121 tilted upon its axis, and the parts carried by it will be moved.

The counter shaft 31 shown in Fig. 4 protrudes beyond its bracket on the opposite side from the crank pin plate 32, and upon the end of it is fixed a pinion 130 which is constantly revolving in the same direction, that is to say, as indicated by the arrow in Fig. 12.

On the upper edge of the triangular plate 121, there are three "V" shaped notches 131. Upon the bracket 2 is mounted a spring actuated latch 132 having a hook upon its end adapted to engage one of the notches 131 and hold the plate 121 stationary until it is moved by the action of the lever 116. 133 is a stationary arm projecting from the upper end of the bracket 2, and upon the end of the arm 133 is pivoted a lever 134, one end of which extends toward the valve rod 27, and is connected to that valve rod by a pair of links and set-nuts 135, which permit an adjustment of the point of connection of the lever 134 to the rod 27. At its opposite end the lever 134 has suspended from it a slotted plate 136, the slot being slightly greater in width than the diameter of the pinion 130, and on the interior of each of the legs formed by the slot in the plate is cut a rack. One of the legs is longer than the other, and on the long leg 137, the rack extends from the end of the leg to a point opposite the center of the counter-shaft 31 when the parts are in their normal position. The rack on the shorter leg 38 extends from the end of the leg which terminates at a point opposite the center of the counter shaft 31 up to the upper end of the leg which is above the opening, the highest tooth on the rack 137 and the lowest tooth on the rack 138 being opposite one another. The teeth of the racks 137 and 138 are of a size to mesh with the pinion 130. The racks 137 and 138 stand between the pins 124 and 125 upon the two lower corners of the plate 121 so that the plate carrying the racks may be moved by the motion of the plate 121 and one or the other of the racks be thrown into engagement with the pinions. On the outside of the racks 137 and 138 are the lugs 139 and 140, which have inclined surfaces. These lugs are of such a size that when they make contact with the pins 124 and 125 upon the plate 121, the pins will hold the racks out of contact with the pinion and cause the plate to hang in a central position. If, now, a drop of speed occurs, and with it a drop of the governor head and of the lever 24 and the rod 27, the valve will be opened in such a manner as to cause the gate to begin to open, the downward motion of the rod 27 will carry with it the links 135 and the ends of the lever 134 which is connected to those links. The opposite end of the lever 134 will consequently be raised a corresponding distance. If the drop in speed is greater than an arbitrarily determined amount, the downward motion of the lever 24 will cause the free end of the lever 116 to rise, make contact with the link 126 and draw upon it, rocking the plate 121 upon its point of support and throwing the rack 137 into contact with the pinion 130. The previous descent of the rod 27 will have drawn the rack 137 up until its lower end is opposite the pinion 130. Immediately upon the engagement of the rack 137 with the pinion 130, (which is constantly running) the pinion turning in the direction of the rack will draw it downward as far as its teeth will permit, and with it the lever 134, raising the rod 27 and closing the main valve. If, on the other hand, the reverse motion takes place, and instead of a drop of speed there is an abnormal acceleration of speed, the lever 24 and the rod 27 being drawn up, the lever 134 which carries the plate 136 will be depressed, and the upper part of the rack 138 brought opposite the pinion 130. As soon now as the lever 24 has gotten up as far as it is desired it shall go the pin 129 in the end of the lever 116 will make contact with the lower end of the slot 127 and force the link 126 outward, rocking the plate 121 in the opposite direction from its former motion, throwing the pin 125 against the back of the rack 138 into engagement with the pinion 130, which turning in the direction shown by the arrows in Fig. 12 will raise the rack 138, and with it the lever 134, draw the rod 27 down and open the valve. This action is clearly independent of any readjustment of speed on the part of the governor head, and takes place in anticipation of the re-establishment of the speed of the governor head, and the adjustment of its governor weights. It may be, however, that the motion of the plate 121 will not be sufficient to throw one of the racks into engagement with the pinion but only sufficient to raise the end of the hook 132 to the top of the tooth 131. As soon as this condition is reached, the spring of the hook 131 will force the hook down into the next notch beyond the middle position through the rack 137 into contact with the pinion, and hold it there until the pinion has drawn the rack down to the lowest tooth. When it has accomplished this, it has performed its whole duty, and the plate must be restored to its central position, so as to be ready to perform the same function again.

The restoring of the plate 121 and the racks to their central position is accomplished by the inclined lugs 139 and 140, which are on the backs of the racks respectively. When the rack 137 has been drawn out to its full length, and the rack 138 has been drawn up to its full length, the lugs 139 and 140 will come into contact with one or the other of the pins 124 or 125 as the case may be, and force the hooks 132 out of the notch on one side or the other to the center of the plate, and into the notch at the center, and by the same operation center the racks over the plates, and on each side of the pinion, but out of contact with it.

It will be observed that the adjustment of the lever 24 upon the valve rod, of the lever 134 upon the valve rod, the adjustment of the length of the slot 127, of the length of the link 126 and the length of the link 119, make it possible to regulate definitely the period during which the valve is to be permitted to remain at any particular position, that is to say, how long a time the main valve has to be permitted to remain open so as to exhaust pressure either above or below the piston, and permit the piston to move. In some case it may be desirable that the piston should move for a very short period of time, in others it should move for a longer period of time, dependent upon various conditions—generally the condition of head and the size of the wheel.

It will be observed that when the valve is closed by the action of the auxiliary mechanism, the lever 24 will also be raised, and with it the screw and nut, compressing the spring above the nut and moving the governor weights to a position dependent upon the motion of the lever 24.

If the forces developed by the speed of the weights be such as to hold them off their normal position, the valve will return to the position corresponding to the normal position of the governor weights as soon as the pinion 130 reaches the racks 137 and 138. If this motion of the valve is abnormal, the auxiliary mechanism will be again operated, and the valve again closed, and this step by step motion will be repeated until the speed returns to the point approximately normal within which the valve may move without affecting the auxiliary mechanism.

It will be understood that when the pressure on one side of the piston has been reduced below normal it can never be restored to normal until the main valve is reversed and the pressure exhausted to a corresponding degree on the other side; but as the relay device only restores the main valve to normal and never to reverse position, the pressure when once reduced on one side of the piston will always remain less than the other side until reversed, hence the gate once started to move in one direction will not be wholly stopped by the action of the relay, but the speed will, by the relay, be reduced to a minimum speed, and held at this minimum until another impulse by the head, or until stopped by the reversal of the valve by the head or by the oscillating device. The main valve is loose enough in its valve chest and has a certain amount of lead so that the exhaust is always open wide enough to permit sufficient water to escape.

It will be remembered, as has been heretofore stated, that the main valve is loose in its valve chest; and although the ends of the valves stand opposite the ports of the cylinder, they never close them, but always leave a certain space for the flow of fluid past the valve to exhaust, both from the cylinder and from both ends of the valve chest. Sometimes it is desirable to give the main valve a certain amount of lead, to exhaust on both ends, in which case as the valve is moved out of its central position by the governor head, the passage way to exhaust at one end will be greater than at the other, hence, as the pressure is relieved by the greater exhaust at one end, the valve 61 will be moved by the increased pressure on the other end back into its central position. Thus we will get for each motion of the valve out of its central position a creation of a condition which will tend to force the valve back into central position by fluid pressure. The opposing forces acting on the main valve, that is to say, the weight of the governor head and the weight of the valve itself, act to force the valve down in case of a drop in speed; and the fluid pressure in the valve chest acting to force it up to central position when depressed will give to the valve and to the parts to which the valve is connected, and also to those which are controlled by it, a vibrating motion. This vibration will take place in the same manner, whether the valve be lowered by a drop of speed, or raised by an acceleration of speed. As the valve rises and falls, the springs 19$^a$ will be more or less compressed, and the weights 16—16 will be more or less moved into a circle of greater or less radius. As the radius increases or decreases, the resistance of the air to the weights will be increased or decreased, and the strength of the pull of the weights upon the spring 14 will be greater or less with each change of radius. The spring 14 will yield to any change in the pull of the weights and will again restore them to their normal position. The spring 14 will thus act as a hair spring of a watch while the valve will be moved by the change of pressures above and below it, much in the same way as the valve of a hydraulic ram moves, being moved by the current flowing past it but settling by gravity when the current is checked. The natural oscillation of the valve due to the causes described may be insured and regulated by mechanical means, such a device I have shown and described in this application. The amplitude of the oscillation of the governor head and the main valve can be regulated and controlled to be anything that may be desired. When a drop of speed occurs, and the main valve is dropped, so as to exhaust pressure on the side of the piston which will permit the gate to open, if the drop of speed is not abnormal, the action of the artificial vibration of the main valve will be to close and open the main valve alternately, and thus check and accelerate the motion of the gate with each vibration. This successive acceleration and checking or retardation of the motion of the gate (for it never stops entirely while speed is changing) will give to the gate a step by step motion, which will permit the added water admitted to the runner with each step to become effective upon the wheel to build up its speed before another step is taken.

If the drop of speed is abnormal and the main valve be carried down to a point where the return of its vibration will not bring it back to the ports at all, then the relay mechanism is brought into play, by which it is returned, to speed position.

As before stated, it will be understood that when the main valve is once so moved as to reduce the pressure on one side of the piston and start it moving toward the reduced pressure, it will continue to move in that direction until normal pressure is restored on that side of the piston, and this will not occur until the valve is temporarily reversed.

The valve is loose in its valve chest and has some lead on the exhaust side but none on the admission, so that the exhaust is never closed when the valve is in its central position; therefore, while the return of the valve to central position will check the motion of the gate, it will not stop it, but will reduce it to a minimum speed, at which speed it will continue to travel until the valve is reversed. The same action takes place as the result of the vibration of the main valve by the constant vibration mechanism, but as before stated, if the main valve is moved a distance too great for the vibration to return it to the ports at all, the independent relay must be called into action. The period between the changes in the position of the valve, due to the relay, is much longer than the period due to the normal vibration; and the period due to the relay is capable of regulation so as to be anything that may be desired. The effect of the relay, like that of the vibration, is to cause a successive acceleration and retardation in the motion of the gate, the amount of acceleration and the period of retardation being susceptible of regulation.

During the first or small changes of speed, the normal vibration will cause small accelerations and corresponding periods of retardation; with greater changes of speed, the relay will cause larger acceleration and corresponding periods of retardation, and as speed is approached the main valve will be moved to a point where it will not reach the relay trip and consequently will be wholly under the control of the governor head, and the vibrating mechanism, and the amount of acceleration and the period of retardation will be again reduced to a minimum, and as the wheel approaches speed and the valve is vibrated into the reverse position, the difference between acceleration and retardation will become smaller and smaller until they are equal, and the gate will then remain at speed without motion other than its normal pulsation.

A condition often arises which has heretofore caused serious trouble, and which my invention takes care of automatically.

The gate of a turbine water wheel is usually out of balance, and the amount it may be out of balance will vary in the same wheel with change of gatage. It is important therefore that a governor should automatically take care of this variation of over-balance. It will be understood that if the gate is balanced and the wheel at speed, the valve will stand opposite its ports in the same relation to each port, and as it is vibrated will change the pressure from one side to the other side of the piston equally, and maintain a practically equal pressure on each side of the piston. If, now, the gate be out of balance, say 1000 lbs., this tendency to move in one direction will cause the gate to move until the speed of the wheel is so altered as to effect the governor and the governor will move the main valve into a position which will correct the error in speed and check the motion of the gate notwithstanding the over-balance, and bring the gate to a state of rest at speed, in spite of the over-balance. Now it will be apparent that in order that the gate may be held stationary at speed position, when it is over-balanced, it will be necessary that the valve shall also occupy a position which will cause a greater pressure on one side of the piston than on the other so as to counterbalance the over-balance of the gate. There will therefore be a speed position for the valve with one condition of over-balance in the gate, and a different speed position of the valve for another condition of over-balance of the gate; and as the position of the valve is due to speed—and the condition of the governor weights is due to speed and the resistance which is opposed to the centrifugal force caused by speed; it will follow that the position of the weights and valves will be the same so long as the speed is the same and the resistance of the centrifugal force is the same; but, as before explained, as the main valve gets more and more out of its central position, the over-balance of pressure on it, due to the unequal outlet to exhaust from the two ends of the valve chest, will cause the valve to be forced in the direction of reduced pressure, and this pressure on the valve will vary the resistance to centrifugal force acting on the governor head and establish a new speed position for the governor weights which will correspond to the new speed position of the valve; thus with every variation of the over-balance of the gate, there will be a new speed position for the valve and a corresponding speed position for the governor head.

1. The method of increasing the efficiency of the governor of a prime motor, which consists of imposing upon the motor controller a constant auxiliary vibration.

2. The method of increasing the efficiency of the governor of a prime motor, which consists of imposing upon the said governor and the motor controller a constant auxiliary vibration.

3. The method of increasing the efficiency of the governor of a prime motor which consists of imposing upon said governor a constant auxiliary vibration.

4. The method of governing a prime motor, which consists of imparting to the motor controller a constant, artificial oscillating motion, and then augmenting the amplitude of the oscillation in the direction in which it is desired the parts shall move while still maintaining the same constant period and amplitude of oscillation.

5. The method of governing a prime motor which consists of alternately reducing the pressure on opposite sides of the motor controller an equal amount, producing a constant artificial oscillation of the piston across a median line, and then still further reducing the pressure on the side toward which it is desired the piston shall move, while maintaining the same interval and extent of amplitude or of oscillation, so as to maintain the same period and amplitude of oscillation in the controller, on each side of a new median line.

6. The method of governing a prime motor which consists of moving the motor controller slowly for slight changes, and rapidly for great changes of speed, and then moving the controller slowly as speed is approached.

7. The method of governing a prime motor which consists of moving the governing mechanism by which the power admitted to the motor is increased or decreased, first such a distance as to start the increase of admission or reduction of power to the motor at a minimum velocity, then increasing the admission or reduction of power to the motor to a maximum velocity, depending upon the maximum change of speed, and then reducing the speed with which power is admitted to or cut off from the motor to a minimum velocity.

8. The method of governing a prime motor which consists of admitting increased power to the motor or reducing the power admitted to the motor at a minimum velocity, and then increasing the velocity of admission or reduction of the power to a maximum, corresponding with the maximum change of speed to be compensated for, and then reducing the speed of admission or reduction to a minimum until government is accomplished.

9. The method of governing a water wheel which consists of normally increasing the velocity of the admission or reduction of power to the motor corresponding to the load as it is increased or decreased, then increasing it decreasing the admission or reduction of power to the motor abnormally when the abnormal change of load occurs.

10. The method of governing a prime motor, which consists in increasing or reducing the power admitted to the motor at a velocity normally corresponding to the increase or decrease of the load, and then abnormally increasing or decreasing the velocity with which power is admitted to or cut off from the motor when the abnormal increase or decrease of load occurs.

11. The method of governing a prime motor which consists of gradually increasing the velocity of government as the power of the motor is increased, and inversely reducing the velocity of government as the load is reduced.

12. The method of governing a prime motor which consists of increasing or decreasing the velocity of government proportionately to the load.

13. The method of governing a prime motor which consists of reducing the velocity of government correspondingly as the load declines, until minimum speed is reached, and then maintaining that speed of government until the motor is shut down.

14. The method of governing a prime motor which consists of operating the governing device at a speed corresponding to the load and to the change of load so that with small change of load the velocity of government will be slight, while with large changes of load the velocity of government will be rapid.

15. The method of governing a prime motor which consists of balancing the controller valve between gravitation and the pressure of fluid escaping past it to exhaust by so moving the valve as to open one of its exhaust ports to exhaust wider than the other, and then unbalancing the valve by moving it until both its exhaust ports are equally open to exhaust, whereby the fluid pressure being equalized on both sides of the valve, it may move under the influence of gravitation, and as it does so, it will again open one of its ports wider to exhaust than the other, and thus unbalance the pressures again, overcome the force of gravitation and relieve the valve, thus producing in the valve and the parts controlled by it, an oscillated motion.

16. The combination of a motor controller, a governor, means actuated by the governor for moving the controller to accelerate or retard the motor, and mechanism to temporarily retard the change of position of the controller after it has moved a certain distance and before it reaches speed position.

17. The combination of a motor controller, a governor, means actuated by the governor for moving the motor controller to accelerate or retard the motor, and mechanism operated by the governor when it has moved a predetermined distance either in acceleration or retardation to temporarily retard the motion of the motor controller after it has moved a certain distance independently of the governor.

18. The combination of a motor controller, a governor, means actuated by the governor for moving the motor controller to accelerate or retard the motor, and mechanism operated by the governor when it has moved a predetermined distance either in acceleration or retardation to temporarily retard the motion of the motor controller independently of the governor.

19. The combination of a motor controller, a governor, means actuated by the governor for moving the motor controller to accelerate or retard the motor, and mechanism operated by the governor when it has moved a predetermined distance either in acceleration or retardation to retard the motion of the motor controller and maintain it at a minimum velocity until it is again accelerated through the further action of the governor.

20. The combination of a motor controller, a governor, means actuated by the governor for moving the motor controller to accelerate or retard the motor, a constantly running pinion, a lever connected to the motor controller and moved by the governor as it moves the motor controller, and a rack connected to the lever, the rack being thrown into engagement with the pinion by an excessive motion of the governor, and when such engagement occurs the pinion operating to retard the motion of the motor controller and maintain it at a minimum velocity until it is again accelerated through the further action of the governor, the retarding device being independent of the governor.

21. The combination of a motor controller, a governor, means actuated by the governor for moving the motor controller to accelerate or retard the motor, a constantly running pinion, a lever connected to the motor controller and moved by the governor as it moves the motor controller, and two racks connected to the lever and arranged one on each side of the pinion, one or the other of said racks being thrown into engagement with the pinion by an excessive movement of the governor in acceleration or retardation as the case might be, and when such engagement occurs the pinion, rack, and lever operating to retard the motion of the motor controller independently of the governor.

22. The combination of a motor controller, a governor, means actuated by the governor for moving the motor controller to accelerate or retard the motor, a constantly running pinion, a lever connected to the motor controller and moved by the governor as it moves the motor controller, two racks connected to the lever and arranged one on each side of the pinion, a plate pivoted in a plane parallel to the plane of the racks and provided with two pins upon its lower corners which stand behind the racks, a rod connected to the plate at one end and to the governor at the other end, the connection to the governor having a certain amount of lost motion permitting some motion of the governor and some of the motor controller until the lost motion has been taken up, when the further motion of the governor will draw or push the rod and as it draws or pushes the rod force one or the other of the racks into contact with the pinion, whereby the motion of the motor controller will be checked independently of the governor.

23. The combination of a motor controller, a governor, means actuated by the governor for moving the motor controller to accelerate or retard the motor, a constantly running pinion, a lever connected to the motor controller and moved by the governor as it moves the motor controller, two racks connected to the lever and arranged one on each side of the pinion, a plate pivoted in a plane parallel to the plane of the racks and provided with two pins on its two lower corners which stand behind the racks, a spring latch adapted to engage one of a series of notches in the top of the plate, a rod connected to the plate at one end and to the governor at the other end, the connection to the governor having a certain amount of lost motion permitting some motion of the governor and of the motor controller until the lost motion has been taken up, when further motion of the governor will draw or push the rod and as it draws or pushes the rod force one or the other of the racks into contact with the pinion, whereby motion of the motor controller will be checked independently of the governor.

24. The combination of a motor controller, a governor, and means actuated by the governor for moving the motor controller to accelerate or retard the motor, a constantly running pinion, a lever connected to the motor controller and moved by the governor as it moves the motor controller, two racks connected to the lever and arranged one on each side of the pinion, a plate pivoted in a plane parallel to the plane of the racks and provided with two pins on its two lower corners which stand behind the racks, a spring latch having a V-shaped point adapted to engage one of a series of V-shaped notches in the top of the plate, a rod connected to the plate at one end and to the governor at the other end, the connection to the governor having a certain amount of lost motion permitting some motion of the governor and of the motor controller until the lost motion has been taken up, when the further motion of the governor will draw or push the rod and as it draws or pushes the rod force one or the other of the racks into contact with the pinion, whereby the motion of the motor controller will be checked independently of the governor.

25. The combination of a motor controller, a governor, means actuated by the governor for moving the motor controller to accelerate or retard the motor, a constantly running pinion, a lever connected to the motor controller and moved by the governor as it moves the motor controller, two racks connected to the lever and arranged one on each side of the pinion, each rack being provided with a beveled lug on its outside edge, a plate pivoted in a plane parallel to the plane of the racks and provided with two pins on its two lower corners which stand behind the racks, a rod connected to the plate at one end and to the governor at the other end, the connection to the governor having a certain amount of lost motion permitting some motion of the governor and of the motor controller until the lost motion has been taken up, when the further motion of the governor will draw or push the rod and as it draws or pushes the rod will force one or the other of the racks into contact with the pinion, whereby the motion of the motor controller will be checked independently of the governor.

26. In a governor for prime motors, the combination of a motor controller, means actuated by the governor for moving the motor controller to accelerate or retard the motor, a constantly running pinion, a lever connected to the motor controller and moved by the governor as it moves the motor controller, two racks connected to the lever and arranged one on each side of the pinion, the uppermost tooth of one rack being on the same level as the lowermost tooth of the opposite rack, a plate pivoted in a plane parallel to the plane of the racks and provided with two pins on its two lower corners which stand behind the racks, a rod connected to the plate at one end and to the governor at the other end, the connection to the governor having a certain amount of lost motion permitting some motion of the governor device and of the motor controller until the lost motion has been taken up, when the further motion of the governor will draw or push the rod and as it draws or pushes the rod force one or the other of the racks into contact with the pinion, whereby the motion of the motor controller will be checked independently of the governor.

27. The combination of a motor controller, a governor, means actuated by the governor for moving the motor controller to accelerate or retard the motor, a constantly running pinion, a lever connected to the motor controller and moved by the governor as it moves the motor controller, two racks connected to the lever and arranged one on each side of the pinion, the uppermost tooth of one rack being on the same level as the lowermost tooth of the opposite rack and each rack having a beveled lug on its outside edge located opposite to one another and one opposite to the uppermost tooth of the lower rack and the other opposite to the lowest tooth of the upper rack, a plate pivoted in a plane parallel to the plane of the racks and provided with two pins on its two lower corners which stand behind the racks, a rod connected to the plate at one end and to the governor at the other end, the connection to the governor having a certain amount of lost motion permitting some motion of the governor and of the motor controller until the lost motion has been taken up, when the motion of the governor will draw or push the rod and as it draws or pushes the rod force one or the other of the racks into contact with the pinion, whereby the motion of the motor controller will be checked independently of the governor.

28. The combination of a governor, a motor controller, and mechanism connecting the governor with the motor controller, and mechanical means for imparting to the governor auxiliary and independent vibrations.

29. The combination of a governor, a motor controller, mechanism connecting the governor with the motor controller, a crank driven from the motor and running constantly, and devices connecting the crank with the governor, whereby a constant, auxiliary, and independent vibration may be imparted to the governor.

30. The combination of a governor, a motor, a motor controller, mechanism connecting the governor with the motor, and mechanical means for imparting to the governor and to the controller a constant artificial and independent vibration.

31. The combination of devices driven from a common center by centrifugal force, mechanism connecting this centrifugal device with the motor controller, and mechanical means for imparting to the centrifugal device a constant, auxiliary, and independent vibration.

32. The combination of devices driven from a common center by centrifugal force, mechanism connecting the centrifugal devices with the motor controller, a crank driven from the prime motor and running constantly, and devices connecting the crank with the centrifugal device, whereby a constant, auxiliary and independent vibrating motion may be imparted to the centrifugal device.

33. The combination of devices driven from a common center by centrifugal force, a motor, and a motor controller, mechanism connecting the centrifugal devices with the prime motor, and mechanical means for imparting to the centrifugal device and to the motor controller a constant, auxiliary, and independent vibration.

34. The combination of a governor, a motor, a motor controller, including a piston maintained within a cylinder in a state of balance between active opposing pressures and moved by reducing the pressure on the side toward which it is desired the piston shall move, and a valve controlling inlet and exhaust to and from said cylinder, mechanism connecting the governor to the motor controller, and a mechanical device for imparting to the valve of the motor controller a constant, auxiliary and independent vibratory motion.

35. The combination of a governor, a motor, a motor controller consisting of a piston maintained within a cylinder in a state of balance between active opposing pressures and moved by reducing the pressure on the side toward which it is desired the piston shall move, a main valve controlling inlet and exhaust to and from the cylinder, and an independent exhaust valve, means connecting the governor with the main valve, and means connecting the exhaust valve with the piston, substantially as described.

36. The combination of a governor, a motor, and a motor controller consisting of a piston maintained within a cylinder in a state of balance between active opposing pressures and moved by reducing the pressure on the side toward which it is desired the piston shall move, a main valve controlling inlet and exhaust to and from the cylinder, an independent exhaust valve and a relief valve, means connecting the governor with the main valve, means connecting the exhaust valve with the piston, and means connecting the relief valve with the main valve stem, the relief valve when opened relieving the pressure on one side of the exhaust valve so as to cause it to move independently of the piston.

37. The combination of a governor, a motor, and a motor controller consisting of a piston maintained within a cylinder in a state of balance between active opposing pressures and moved by reducing the pressure on the side toward which it is desired the piston shall move, a main valve controlling inlet and exhaust to and from the cylinder, an independent exhaust valve and a relief valve, means connecting the governor with the main valve, means connecting the exhaust valve with the piston, a spring dash pot in the connections between the exhaust valve and the piston whereby the exhaust valve may be restored to its normal relation to the piston when the relief valve has been closed after having been opened, and means connecting the relief valve with the main valve stem, the relief valve when opened relieving the pressure on one side of the exhaust valve so as to cause it to move independently of the piston.

38. The combination of a governor, a motor, and a motor controller consisting of a piston maintained within a cylinder in a state of balance between active opposing pressures and moved by reducing the pressure on the side toward which it is desired the piston shall move, a main valve controlling inlet and exhaust to and from the cylinder, an independent exhaust valve and a relief valve, means connecting the governor with the main valve, means connecting the exhaust valve with the piston, and means connecting the relief valve with the main valve stem permitting a desired motion of the main valve without affecting the relief valve, and means for adjusting the relation of the two valves.

39. The combination of a governor, a motor, and a motor controller, consisting of a piston maintained within a cylinder in a state of balance between active opposing pressures and moved by reducing the pressure on the side toward which it is desired the piston shall move, a hollow balanced main valve controlling inlet and exhaust to and from the cylinder, and an independent cup-shaped exhaust valve covering and surrounding the main valve and controlling the exhaust independently of the main valve and both contained within a valve chest having a by-pass from the portion of the chest above the cup-shaped exhaust valve to exhaust from the valve chest, a relief valve controlling this by-pass, means connecting the relief valve to the main valve stem permitting the desired motion of the main valve independently of the relief valve.

40. The combination of a motor controller, two valves by which it is actuated, one the normal admission and exhaust valve and a second valve controlling the exhaust of the former and operating independently of the former so that under certain conditions while the former valve may have a large opening to exhaust and admission the second may only have a small opening, and vice versa.

41. The combination of a governor, a motor, and a motor controller consisting of a piston maintained within a cylinder in a state of balance between active opposing pressures and moved by reducing the pressure on the side toward which it is desired the piston shall move, a valve controlling inlet and exhaust to and from said cylinder, and mechanism connecting the governor to the valve, whereby the valve will be moved an amount proportionate to the variation of speed and the piston will be caused to move at a velocity corresponding to change of speed.

42. The combination of a motor, a motor controller comprising an admission valve and an exhaust valve, a governor connected to and operating the admission valve, and connections between the gate and the exhaust valve whereby that valve is caused to follow the motion of the gate, the elements co-operating to produce a speed of government corresponding to the amount of the change of speed.

43. The combination of a motor, a motor controller comprising an admission valve, an exhaust valve, a governor connected to and operating the admission valve, and connections between the gate and the exhaust valve whereby the valve is caused to follow the motion of the gate, and a relief valve for the exhaust valve tripped into action by the governor upon abnormal changes of speed, the elements co-operating to produce a speed of government corresponding to the amount of change of speed.

44. The combination of a motor, a motor controller, and a governor, the governor responding to changes of speed, means connected to the motor controller and operating to increase or decrease the speed of regulation as the power of the motor is increased or decreased, the speed being normally corresponding to the power admitted to the motor.

45. The combination of a motor, a motor controller, and a governor, the governor responding to changes of speed, means connected to the motor controller and operating to increase or decrease the speed of regulation as the power of the motor is increased or decreased, the speed being normally proportionate to the power admitted to the motor, and independent means connected to and operated by the governor whereby the controller is moved abnormally at an abnormal velocity when abnormal changes of speed occur.

46. The combination of a governor, a valve chest having two admission ports and an exhaust port, a balanced valve loose in its chest and having a lead to exhaust over each admission port, the valve being connected to and controlled by and controlling the governor head, and a motor controller operated by pressure controlled by the valve, whereby the valve when moved off its admission ports by the governor head will be driven back by hydraulic pressure in its chest and will correspondingly move the governor head, thereby imparting vibratory motion to the parts, substantially as described.

47. The combination of a motor, a motor controller, and a governor, the governor responding to changes of speed and operating the controller to increase or decrease the power admitted to the motor, the controller operating to admit power to the motor at a velocity corresponding to the load being carried by the motor.

48. The combination of a motor, a controller, a governor, and means for increasing or decreasing the velocity of government corresponding to the load.

49. The combination of a motor, a controller, a governor, and means for reducing the velocity of government corresponding to the load as it declines, until minimum load is reached, and then maintaining that speed of government until the motor is shut down.

50. The combination of a motor and a motor controller, and means imparting to the motor controller a constant auxiliary vibrating motion.

51. The combination of a motor, a motor controller, and means for alternately reducing the pressure on opposite sides of the motor controller an equal amount, producing a constant auxiliary vibration across a median line in all positions of the controller.

52. The combination of a motor, a controller, a governor, and means imparting to the motor controller a slow motion for slight changes of speed and a rapid motion for great changes, but always a slow motion as speed is approached.

53. The combination of a motor, a controller, a governor, and means for moving the controller first such a distance as to start the increase or decrease of admission of power to the motor at a minimum velocity, then increasing the admission or reduction of power to the motor to a maximum velocity, depending upon the maximum change of speed, and then reducing the speed with which power is admitted to, or cut off from the motor to a minimum velocity.

54. The combination of a motor, a controller, and means for normally increasing the velocity of the admission of power to the motor corresponding to the load as it is increased or decreased and increasing or decreasing the admission or reduction of power to the motor abnormally when an abnormal change of load occurs.

55. The combination of a motor, a controller, a governor, and means for gradually increasing the velocity of government as the power of the motor is increased and inversely reducing the velocity of government as the power is reduced.

56. The combination of a motor, a controller having a valve, and means for balancing the controller valve between gravitation and the pressure of fluid escaping past it to exhaust by so moving the valve as to open one of its exhaust ports to exhaust wider than the other, and then unbalancing the valve by moving it until both its exhaust ports are equally open to exhaust, whereby the fluid pressure being equalized on both sides of the valve, it may move under the influence of gravitation, and as it does so, it will again open one of its ports wider to exhaust than the other, and thus unbalance the pressures again, overcome the force of gravitation and relieve the valve, thus producing in the valve and the parts controlled by it, a vibrating motion.

57. In a governor for prime motors or the like, the combination of a gate-moving mechanism and means for causing the gate to move rapidly for great changes of load and independent means for causing it to move slowly for small changes.

58. In a governor for turbines or the like, the combination with a gate-moving mechanism of means for causing the gate to move rapidly for great changes of load and slowly for slight changes and for reducing the speed of the gate as it approaches speed position.

59. In a device for maintaining constant speed in a prime motor under a variable load, the combination of a motor having a gate, a controller, and means to vary the speed of government to correspond to the position of gate.

Signed by me at Baltimore city and State of Maryland this third day of July, 1906.

FRANCIS ELLICOTT.

Witnesses:
  WILLIAM W. POWELL,
  JOHN E. CROSS.